US012794029B2

(12) United States Patent
Pfeiff

(10) Patent No.: US 12,794,029 B2
(45) Date of Patent: Nov. 10, 2026

(54) BATTERY ARRANGEMENT, MOTOR VEHICLE AND METHOD FOR DETECTING A GAS DISCHARGE FROM A BATTERY CELL

(71) Applicant: AUDI AG, Ingolstadt (DE)

(72) Inventor: Markus Pfeiff, Kösching (DE)

(73) Assignee: Audi AG, Ingolstadt (DE)

( * ) Notice: Subject to any disclaimer, the term of this patent is extended or adjusted under 35 U.S.C. 154(b) by 265 days.

(21) Appl. No.: 18/770,665

(22) Filed: Jul. 12, 2024

(65) Prior Publication Data

US 2025/0023130 A1 Jan. 16, 2025

(30) Foreign Application Priority Data

Jul. 14, 2023 (DE) ......................... 102023118696.5

(51) Int. Cl.

| | |
|---|---|
| ***H01M 10/48*** | (2006.01) |
| ***G01M 3/16*** | (2006.01) |
| ***H01M 50/204*** | (2021.01) |
| ***H01M 50/249*** | (2021.01) |
| ***H01M 50/342*** | (2021.01) |

(Continued)

(52) U.S. Cl.

CPC ......... *H01M 10/482* (2013.01); *G01M 3/165* (2013.01); *H01M 50/204* (2021.01); *H01M 50/249* (2021.01); *H01M 50/3425* (2021.01); *H01M 50/358* (2021.01);

(Continued)

(58) Field of Classification Search

CPC .... H01M 10/00; H01M 10/48; H01M 10/482; H01M 50/204; H01M 50/249; H01M 50/3425; H01M 50/358; H01M 50/367; H01M 2200/20; H01M 2220/20; G01M 3/165; B60R 16/033

See application file for complete search history.

(56) References Cited

U.S. PATENT DOCUMENTS 6,143,440 A * 11/2000 Volz .................... H01M 50/578 429/61

FOREIGN PATENT DOCUMENTS

DE 102019219593 A1 6/2021
DE 102020004558 A1 1/2022

(Continued)

OTHER PUBLICATIONS

Machine Translation of DE-102021203586-A1 (Year: 2022).*

(Continued)

*Primary Examiner* — Nguyen Q. Ha
(74) *Attorney, Agent, or Firm* — Maier & Maier, PLLC

(57) ABSTRACT

A battery arrangement includes a sensor device configured to detect a gas discharge from at least one battery cell of the battery arrangement, the at least one battery cell having a releasable cell degassing opening. The battery arrangement includes a gas discharge channel having at least one gas inlet region, at least one gas discharge region, and at least one flow path extending from the at least one gas inlet region to the at least one gas discharge region. The sensor device includes at least one sensor element arranged in the gas discharge channel and projecting into the at least one flow path. The at least one sensor element includes an electrical line to which a test voltage is applied. The electrical line is damageable by gas emerging from the releasable cell degassing opening and flowing through the gas discharge channel along the at least one flow path.

13 Claims, 2 Drawing Sheets

(51) Int. Cl.
*H01M 50/358* (2021.01)
*H01M 50/367* (2021.01)
*B60R 16/033* (2006.01)

(52) U.S. Cl.
CPC ......... *H01M 50/367* (2021.01); *B60R 16/033* (2013.01); *H01M 2200/20* (2013.01); *H01M 2220/20* (2013.01)

(56) References Cited

FOREIGN PATENT DOCUMENTS

| | | | | | |
|---|---|---|---|---|---|
| DE | 102020128756 | A1 | | 5/2022 | |
| DE | 102021203586 | A1 | * | 10/2022 | .......... H01M 50/367 |
| DE | 102021123979 | A1 | | 3/2023 | |
| DE | 102023117132 | A1 | * | 1/2025 | ............ B60L 3/0046 |
| DE | 102023003909 | A1 | * | 3/2025 | .......... H01M 10/625 |
| EP | 2557615 | A1 | * | 2/2013 | .......... H01M 50/574 |
| EP | 4009412 | A1 | | 6/2022 | |
| EP | 4266449 | A1 | * | 10/2023 | ............ H01M 10/48 |
| WO | WO-2023148278 | A1 | * | 8/2023 | .......... H01M 50/325 |

OTHER PUBLICATIONS

Machine Translation of DE-102023003909-A1 (Year: 2025).*
Machine Translation of DE-102023117132-A1 (Year: 2025).*
Machine Translation of EP-4266449-A1 (Year: 2023).*
Search Report issued on Jan. 15, 2024 in corresponding German Application No. 102023118696.5; 14 pages.

* cited by examiner

BATTERY ARRANGEMENT, MOTOR VEHICLE AND METHOD FOR DETECTING A GAS DISCHARGE FROM A BATTERY CELL

FIELD

The invention relates to a battery arrangement with a sensor device for detecting a gas discharge from at least one battery cell of the battery arrangement, wherein the battery arrangement comprises the at least one battery cell, which has a releasable cell degassing opening, and a gas discharge channel with at least one gas inlet region through which a gas emerging from the cell degassing opening can be introduced into the gas discharge channel, with at least one gas discharge region and with at least one flow path from at least one gas inlet region to at least one gas discharge region. Furthermore, the invention also relates to a motor vehicle having such s battery arrangement and a method for detecting a gas discharge from at least one battery cell.

BACKGROUND

Battery cells of high-voltage battery systems, especially for motor vehicles, can generate internal pressure for various reasons and such cells usually have a weakening in the housing provided for this, which is referred to here as a releasable cell degassing opening, to prevent undefined bursting. The outgassing of cells is an indication of a possible critical fault in the battery and subsequent damage, even up to the propagation of the system. For this reason, it is advantageous to be able to identify such a fault case in order to initiate warnings to a user and safety functions within the high-voltage battery. In order to discharge gas escaping from a battery cell, the gas can be introduced into a gas discharge channel, which leads, for example, into the surroundings of the motor vehicle. Such a gas discharge channel can also be called a degassing channel.

DE 10 2019 219 593 A1 describes an electrochemical storage unit with multiple cells and a flow guide element which is connected to at least one of the plurality of electrochemical cells and which comprises a circuit board element on the side of which facing the cells flow channels or flow guide elements are arranged for guiding a fluid emerging from the cells. If the circuit board element breaks at a predetermined breaking point, the connection elements via which the cells are electrically connected are electrically separated.

Furthermore, DE 10 2020 004 558 A1 describes a device for detecting a pressure drop in the event of bursting of bursting elements in a housing of a battery with at least one cell module consisting of multiple battery cells, wherein there is a cavity in the housing which is closed off from the rest of the interior volume of the housing by means of a movable cover. Furthermore, a current conductor with a predetermined breaking point runs over the cover. In addition, the cavity has a pressure equalization hole for equalizing the pressure in the cavity with the rest of the internal volume of the housing. If the pressure slowly increases as a result of outgassing from the battery cells, a corresponding pressure equalization takes place via the pressure equalization hole. If the bursting elements in the housing open abruptly and there is a resulting abrupt drop in pressure, the cover opens and the current conductor ruptures. This allows the pressure drop to be detected.

EP 4 009 412 A1 describes an energy storage device for a railway vehicle with two cell modules that are arranged next to each other and interconnected, wherein the cell modules are connected via a safety device to a signal generator, via which a signal for a fire alarm system can be generated. The cells of the cell modules can each have an overpressure opening. A clamp-shaped holder is arranged above each overpressure opening, in which the signal generator, which can be designed in the form of an electrical line, is accommodated. The signal generator in the form of electrical lines runs across all overpressure openings of the cells. The signal generator can act as a fuse and, in the event of a gas discharge from a cell, can be used to generate a signal for the fire alarm system.

SUMMARY

It is therefore the object of the present invention to provide a battery arrangement, a motor vehicle and a method, which enable a detection of a gas discharge from at least one battery cell in a manner, which is as simplest, space-efficient and reliable as possible.

A battery arrangement according to the invention comprises a sensor device for detecting a gas discharge from at least one battery cell of the battery arrangement, wherein the battery arrangement comprises the at least one battery cell, which has a releasable cell degassing opening, and a gas discharge channel with at least one gas inlet region through which a gas emerging from the cell degassing opening can be introduced into the gas discharge channel, with at least one gas discharge region and with at least one flow path from the at least one gas inlet region to the at least one gas discharge region. The sensor device comprises at least one sensor element arranged in the gas discharge channel and projecting into the flow path, which comprises an electrical line to which a test voltage can be applied, wherein the sensor element is designed such that the electrical line can be damaged by a gas flowing through the gas discharge channel along the at least one flow path and which has escaped from the at least one battery cell, and wherein the sensor device is designed to detect damage to the line to which the test voltage is applied as a function of a measured electrical variable associated with the line and to detect the gas discharge as a function of the detected damage to the line.

The invention is based on the finding that a gas discharge channel can be used jointly for gas discharge by multiple cells of a battery. In other words, several battery cells can be connected to such a gas discharge channel so that the gas escaping from each of the cells can be introduced into the gas discharge channel and discharged via it. Furthermore, the invention is based on the finding that the gas flow generated during gas discharge in such a discharge channel can be used to cause damage to a corresponding sensor element, which in turn can be easily detected by means of an electrical line to which a test voltage can be applied, so that the gas discharge can be detected easily and efficiently In particular, it is not necessary for a sensor element to be provided for each of several battery cells, but rather a sensor element can simultaneously monitor several battery cells for gas discharge, in particular without this sensor element having to extend over all battery cells or having to be otherwise extended. The sensor element can therefore be positioned anywhere in the flow path. The local positioning of such a sensor element anywhere in the gas discharge path is therefore sufficient to detect gas escaping from any cell. This enables the detection of gas discharges from a battery cell in a particularly reliable, cost-effective, space-saving and efficient manner.

A gas discharge channel is understood to be a channel that is designed for targeted gas guidance and channeling. In other words, such a gas discharge channel can comprise channel walls or optionally also gas guide elements arranged within the channel, through which the gas to be discharged can be channeled and guided, i.e. the gas to be discharged is prevented by such channel walls from reaching other regions, for example within the battery housing or within the motor vehicle, which the gas should not reach.

The at least one battery cell is designed with a cell degassing opening, more precisely a releasable cell degassing opening. This means that the cell degassing opening is normally closed and is only released, i.e. opens, under a certain condition. This condition preferably consists in the internal pressure of the battery cell exceeding a certain threshold value. The releasable cell degassing opening is preferably designed as a passive cell degassing opening which opens pressure-dependently and passively, namely depending on the internal cell pressure. For example, the cell degassing opening can be designed as a pressure relief valve, bursting membrane or other local material weakening of the cell housing of the battery cell.

In order to introduce the gas exiting from a cell degassing opening into the gas discharge channel, the cell degassing opening preferably faces the at least one inlet region of the gas discharge channel. The gas inlet region of the gas discharge channel can be designed as a permanent opening in the gas discharge channel, to which such a cell degassing opening is connected, for example, is arranged directly on it and is adjacent to it, and/or the inlet region can also be designed as a releasable opening in the gas discharge channel. For example, the gas discharge channel in the region of this at least one gas inlet region can also be designed with a local or larger-region material weakening, e.g. covered with a thin film, so that the closure closing the releasable opening can be destroyed by the escaping gas in the event of gas escaping from the cell degassing opening, whereby the gas inlet region is released into the gas discharge channel.

The gas inlet region can, for example, extend over several cell degassing openings of several battery cells of the battery arrangement as a common gas inlet region, or such a gas inlet region can be provided for a respective battery cell or its cell degassing opening. This applies in particular if the battery arrangement has several battery cells, as is also preferred.

The battery arrangement can therefore comprise one or preferably multiple battery cells. These battery cells can be formed, for example, as lithium-ion cells. In addition, these can optionally be grouped into battery modules. The multiple battery cells can, for example, provide a high-voltage battery.

The at least one gas discharge region can also be designed as described for the gas inlet region, that is to say, for example, as a permanent opening, or as a releasable opening, for example as a bursting element or pressure relief valve or the like. Here, too, several separate gas discharge regions can be provided, whereby the number of discharge regions can be selected independently of the number of gas inlet regions of the gas discharge channel.

A gas discharge channel can also be understood to mean, in particular, a chamber-like space or the gas discharge channel can comprise such a gas discharge space or such a gas discharge chamber. Such a gas discharge chamber can, for example, be located above or below the battery arrangement or the arrangement of several battery cells and can, for example, extend over all cell degassing openings of these battery cells. Such a gas discharge chamber can be delimited by two opposite chamber walls which enclose a gas discharge space. The sensor element can be arranged accordingly in such a gas discharge chamber, in particular protruding into the space delimited by it and, for example, being arranged on one of the two chamber walls.

In addition to the at least one sensor element, the sensor device can also comprise a measuring device in order to detect the electrical variable associated with the electrical line. In the simplest case, this electrical variable can be an electrical current and/or an electrical resistance. The measuring device can also be designed to apply the test voltage to the electrical line. The test voltage can be applied between two tapping points of the electrical line. If the line is undamaged, this results in a current flow through the electrical line, which can be detected by the measuring device. If the line is damaged, for example if the line is broken, the flow of electricity is interrupted. This can also be detected by the measuring device. This allows damage to the line and consequently gas discharge to be detected. This can be achieved, for example, with a simple conductor loop. However, more complex measuring arrangements are also conceivable in order to be able to detect, for example, not only a severing of the line, but also, for example, damage to the line that does not sever the electrical line, for example due to a change in the resistance of the line. Accordingly, not only or not exclusively the current intensity can be determined or detected as an electrical variable, but also other variables, such as the electrical resistance.

The electrical line can be designed as an electrical conductor. The electrical line can consist entirely of electrically conductive material, preferably metal. The electrical line itself preferably does not have a sheath like a cable. The electrical line can, for example, be designed as a single, conductive wire, in particular as a stranded wire.

Preferably, the sensor device is designed to detect the gas discharge when the condition that the damage to the line has been detected is met. In addition, the sensor device is preferably designed to detect the damage to the line by detecting a predetermined change in the detected electrical variable of the line, for example the current intensity dropping to a value of zero. It is not necessary to detect the drop in itself, but only that no more current flows through the line, i.e. it is sufficient to detect a current of 0 A when the test voltage is applied in order to determine that the line is damaged. Accordingly, it is therefore preferable to detect damage to the line subjected to the test voltage as a function of a measured electrical current intensity associated with the line.

According to a further advantageous embodiment of the invention, the sensor element has a predetermined breaking point, wherein the electrical line can be damaged by damage or breakage of the sensor element at the predetermined breaking point. In principle, the sensor element can solely be provided by the electrical line itself or it can comprise further components, as explained in more detail later. In any case, damage to or breakage of the sensor element in the region of the predetermined breaking point should also cause corresponding damage or even breakage of the line. The predetermined breaking point makes it much easier to damage the sensor element and thus also the electrical line. This allows gas discharges to be detected particularly reliably, and even small gas flows are sufficient to cause damage to the sensor element.

In principle, it is possible to use the heat generated by a gas discharge to damage the sensor element and the electrical line. However, there is also a so-called cold degassing in battery cells, according to which the releasable cell degassing opening of the battery cell opens and pressure equalization with the environment takes place, but no hot gas escapes from the battery cell. Accordingly, it is preferred to use the pressure effect of the escaping gas to induce pressure on the sensor element.

Accordingly, it represents a further, very advantageous embodiment of the invention that the sensor element is designed such that the sensor element can be damaged at the predetermined breaking point by a pressure effect on the sensor element, which can be generated or is generated by a gas flowing along the flow path, that has escaped from the at least one battery cell. The sensor element can therefore be designed in such a way that it is damaged even by a cold gas flowing along the flow path and, for example, breaks or tears off. This also makes it possible to provide the sensor element very close to the gas discharge region of the gas discharge path, wherein further measures or components can be integrated upstream in the gas discharge path in order to effect gas cooling and particle deactivation. This has the advantage that the gas can be cooled along the flow path and can exit the gas discharge channel as a relatively cold gas from the gas discharge opening, i.e. the gas discharge region, whereby a danger to an environment can be reduced to a minimum and, in particular, self-ignition of the gas when it escapes into the environment can be prevented. The use of the pressure effect of the gas therefore has the advantage of providing more flexibility with regard to the positioning of at least one sensor element, since it does not have to be positioned in an region in which the gas to be discharged is still very hot. In addition, gas discharge can also be detected in the case of cold degassing. In addition, the sensor element can be designed particularly easily so that it is reliably damaged by the pressure of the gas flowing along the flow path, since the sensor element can for this purpose, for example, simply be designed with a sufficiently large region to provide a corresponding flow resistance and with a corresponding predetermined breaking point, which gives way or fails at a desired or predetermined flow pressure and accordingly leads to damage or breakage or tearing off of a part of the sensor element.

In a further, very advantageous embodiment of the invention, the sensor element has a carrier, in particular comprising a plastic, on which the electrical line is arranged and/or in which the electrical line is embedded. This has the advantage that the line can be guided and supported more easily in terms of its positioning. At the same time, it also makes it easy to electrically insulate the line from the outside. The carrier can be provided, for example, as a plastic plate or as a plastic film or two plastic films, between which the line is arranged or laminated. Furthermore, it is further preferred that the carrier with the line protrudes into the flow path, in particular wherein the predetermined breaking point is formed at least as a part of the carrier. The carrier also allows for easy attachment of the wire or electrical line. In addition, when using an additional carrier, i.e. in addition to the line, a particularly thin strand can be used as an electrical line with an extremely small line cross-section, and yet the installation can be easily realized and there is no need to fear damage to such a thin conductor as a line even during normal operation. Such a thin design of the electrical line makes it easier to damage in the event of a gas discharge. Nevertheless, the carrier can provide sufficient stability during assembly and normal operation. In addition, such a thin line does not necessarily have to be provided with a predetermined breaking point and, on the other hand, the line itself does not have to provide a large region to provide a large flow resistance. It is therefore sufficient to integrate such a predetermined breaking point into the carrier that carries or stabilizes the line, for example as a notch or slit or similar.

In addition, the use of a carrier advantageously makes it possible to dimension the sensor element with the greatest possible flow resistance with respect to the flow path, without having to dimension the electrical line accordingly. Therefore, it represents a further very advantageous embodiment of the invention if the carrier is designed as a plate or comprises such a plate that has a length and a width that projects into the flow path in the direction of its length, the width of which is greater than a conductor width of the electrical line in relation to a direction perpendicular to the length of the plate, and the surface of which is arranged at an angle other than zero, preferably at a right angle, to a flow direction of a gas flowing along the flow path. Such a plate can therefore be easily formed over a large region so that when it protrudes into the flow path and is aligned perpendicular to the flow path or to the flow flowing through the flow path in the case of degassing, it provides a very large flow resistance which, in combination with the predetermined breaking point, leads to damage or tearing or severing of the sensor element in the region of the predetermined breaking point and thus also to damage to the electrical line, in particular to severing or tearing of the electrical line. The carrier can also comprise two such plates, for example in the form of films, between which the electrical line is embedded. The electrical line can also be embedded in such a film or sheet in an injection molding process.

It is furthermore very advantageous if the carrier has a first end and a second end opposite in a first direction, wherein the carrier is arranged only with the first end on a wall of the gas discharge channel, in particular wherein the predetermined breaking point is arranged closer to the first end than to the second end. This first direction can be defined, for example, in the direction of the length of the carrier. The carrier is therefore only attached to the electrical line on one side. The other end of the sensor element protrudes into the flow path. This makes it particularly easy to tear off or bend the sensor element in the event of a gas flow along the flow path, since the carrier and thus the sensor element are not fixed on both sides and thus stabilized. In addition, it is very advantageous if the predetermined breaking point is arranged closer to the first end than to the second end, since the torque acting on the predetermined breaking point is then significantly greater due to the leverage effect in the case of a gas flow, which simplifies the damage or tearing off of the sensor element in the region of the predetermined breaking point.

In a further very advantageous embodiment of the invention, the electrical line is laid on the carrier in a loop from the first end towards the second end over the predetermined breaking point. For example, the electrical line can be routed from the first end of the carrier towards the second end and from there back to the first end. The electrical line can cross the predetermined breaking point or a predetermined breaking line running in the direction of the width of the carrier twice. Tearing off the sensor element along this predetermined breaking line results in the electrical line being severed twice or in the lower part of this conductor loop being torn off.

The electrical line does not necessarily have to end with its two conductor ends at the first end of the carrier, but can be led beyond the first end of the carrier, for example to the measuring device of the sensor device. This can be located anywhere else. In particular, this can also be located outside the gas discharge channel. The carrier can also be guided together with the line to the measuring device. In this case, the first end of the carrier is to be understood as the first end of the part of the carrier located within the gas discharge channel. The electrical line can be led with its two conductor ends from the interior of the gas discharge channel into an region outside the gas discharge channel up to the measuring device, and the carrier can also optionally continue up to the measuring device in order to stabilize the line and/or to electrically insulate it from the outside.

In a further advantageous embodiment of the invention, the battery arrangement comprises multiple battery cells, which respectively have a releasable cell degassing opening, wherein the gas discharge channel is connected to the cell degassing openings such that a gas escaping from each of the cell degassing openings can be introduced through the at least one gas inlet region in the gas discharge channel. The gas discharge channel therefore represents a collective gas discharge channel that can be used to discharge gases from several battery cells simultaneously. This does not mean that such a gas must also escape from the respective battery cells at the same time. This is to be understood in particular to mean that a gas escaping from a cell is introduced into the same gas discharge channel, regardless of which of several battery cells comprised in the battery arrangement this gas escapes from.

This has the great advantage that, for example, only one sensor element or at least a small number of sensor elements is sufficient to detect gas discharge, regardless of which cell it comes from. The battery arrangement therefore preferably comprises fewer sensor elements than battery cells, in particular at least an order of magnitude fewer sensor elements, preferably a single-digit number of sensor elements, for example only one or two or three or four or five.

If, for example, the gas discharge channel comprises several different flow paths which differ at least in sections with regard to their routing, such a sensor element can be arranged in each of these gas discharge paths and/or in the spatially different sections. If several sensor elements are provided as part of the battery arrangement, they can be connected or coupled to a common measuring device of the sensor device.

In a further advantageous embodiment of the invention, the battery arrangement has a housing in which the at least one battery cell is arranged, wherein the housing comprises a housing wall, in particular a housing base, wherein the battery arrangement has a plate, in particular an underride guard, located outside the housing and opposite the housing wall, wherein the housing wall and the plate represent walls of the gas discharge channel and the flow path runs through the space between the housing wall and the plate, and wherein the sensor element protrudes into the space. As already described above, the gas discharge channel can be delimited by two channel walls, which in the present case are now provided by the housing wall of the battery housing on the one hand and a plate opposite this housing wall. It is particularly advantageous if the housing wall represents a housing base of the battery housing and the plate represents an underride guard for a motor vehicle, in particular of the motor vehicle in which the battery arrangement is used. This advantageously allows gas to be discharged downwards and thus away from a passenger compartment of the motor vehicle. In addition, the space between the underride guard of the vehicle and the housing base of the battery can also be used as a gas discharge channel in a very space-efficient manner. In addition, this allows the gas discharge channel to extend essentially over the entire surface of the battery parallel to the housing base, which means that a very large space is available, for example, for gas cooling measures and for particle separation. The described housing wall and the plate can be limited laterally by a surrounding side wall. Accordingly, the gas discharge channel can be designed to be fluid-tight except for the provided, releasable inlet and discharge openings. This prevents unwanted gas discharge at a location other than the at least one gas discharge region. Through additional structures within this gas discharge channel, the gas can also be channeled and directed in a targeted manner along one or more gas discharge paths. The at least one sensor element can then be arranged such that it protrudes such a gas discharge path. It is particularly advantageous to connect, arrange and/or fix the sensor element on one side, i.e. with one end, as described above, to one of these walls, i.e. either the housing wall or the plate. The arrangement of the sensor element on the housing wall is particularly preferred. This makes it possible to arrange the measuring device of the sensor device above the gas discharge channel and to make the line routing from the sensor element to the measuring device particularly efficient.

The measuring device can be designed to output a signal depending on the detection of the gas discharge, e.g. to output a signal when the gas discharge is detected, depending on which a warning is issued to a user and/or a predetermined reaction measure is initiated, e.g. increasing the cooling capacity of a cooling device for cooling the battery cells, switching off the high-voltage system of the motor vehicle, preventing the motor vehicle from starting or continuing to drive, preventing or interrupting a charging process for charging the battery cells, etc.

Furthermore, the invention also relates to a motor vehicle having a battery arrangement according to the invention or one of its embodiments.

The motor vehicle according to the invention is preferably designed as an automobile, in particular as a passenger car or truck, or as a passenger bus or motorcycle.

Furthermore, the invention also relates to a method for detecting a gas discharge from at least one battery cell of a battery arrangement, wherein a gas exiting from a cell degassing opening of the at least one battery cell is introduced into a gas discharge channel of the battery arrangement through at least one gas inlet region of the gas discharge channel, is guided through the gas discharge channel along at least one flow path from the at least one gas inlet region to the at least one gas discharge region of the gas discharge channel and is discharged from the gas discharge channel through the at least one gas discharge region. The sensor device comprises at least one sensor element arranged in the gas discharge channel and projecting into the flow path, which comprises an electrical line to which a test voltage can be applied, wherein the sensor element is designed such that the electrical line can be damaged by a gas flowing through the gas discharge channel along the at least one flow path and which has escaped from the at least one battery cell, and wherein the sensor device is designed to detect damage to the line to which the test voltage is applied as a function of a measured electrical variable associated with the line and to detect the gas discharge as a function of the detected damage to the line.

The advantages mentioned for the battery arrangement according to the invention and its embodiments thus apply similarly to the method according to the invention.

The measuring device can be part of a control device for the motor vehicle. The control device can have a data processing device or a processor device which is configured to carry out an embodiment of the method according to the invention. For this purpose, the processor device can have at least one microprocessor and/or at least one microcontroller and/or at least one FPGA (Field Programmable Gate Array) and/or at least one DSP (Digital Signal Processor). In particular, a CPU (Central Processing Unit), a GPU (Graphical Processing Unit) or an NPU (Neural Processing Unit) can be used as a microprocessor. Furthermore, the processor device can have program code which is configured to carry out the embodiment of the method according to the invention when it is executed by the processor device. The program code can be stored in a data memory of the processor device. The processor device can be based, for example, on at least one circuit board and/or at least one SoC (System on Chip).

The invention also includes refinements of the method according to the invention, which have features as have already been described in conjunction with the refinements of the battery arrangement according to the invention. For this reason, the corresponding refinements of the method according to the invention are not described again here.

The invention also comprises the combinations of the features of the described embodiments. The invention therefore also comprises implementations which each have a combination of the features of several of the described embodiments, unless the embodiments have been described as mutually exclusive.

BRIEF DESCRIPTION OF THE FIGURES

Exemplary embodiments of the invention are described hereinafter. In the figures.

DETAILED DESCRIPTION

Figure 1:
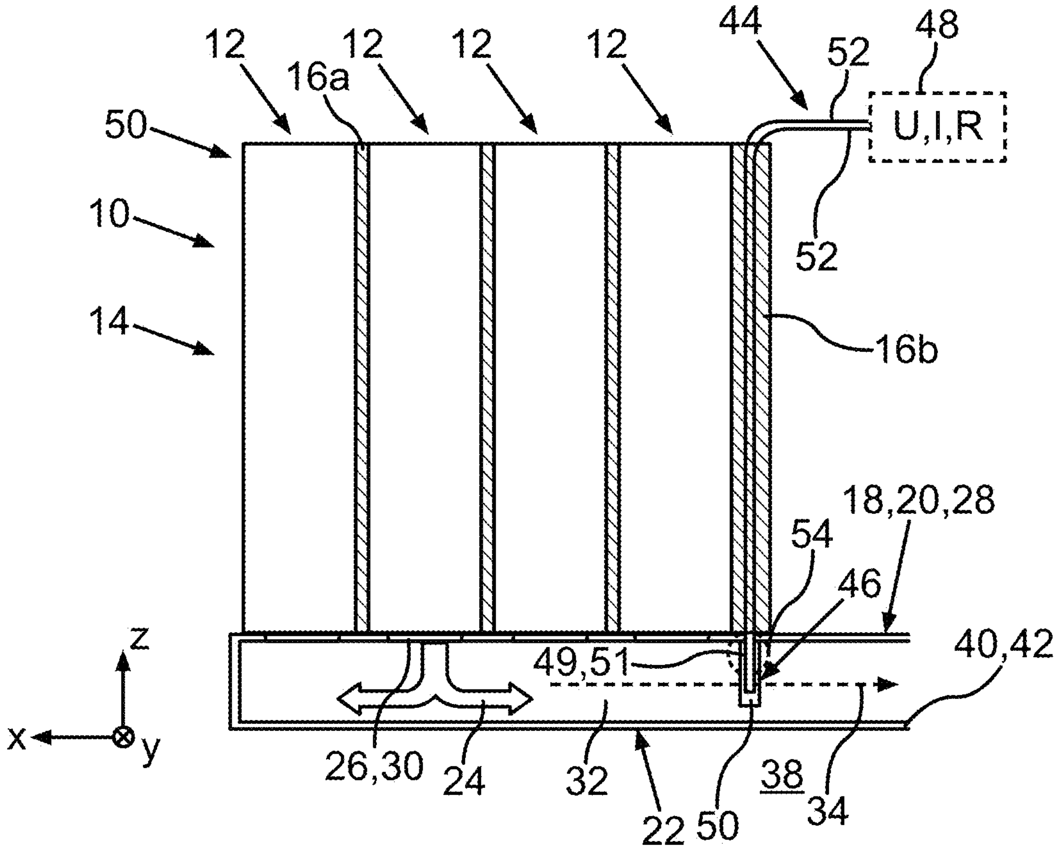
FIG. 1 shows a schematic cross-sectional illustration of a battery arrangement according to one exemplary embodiment of the invention.
Figure 5:
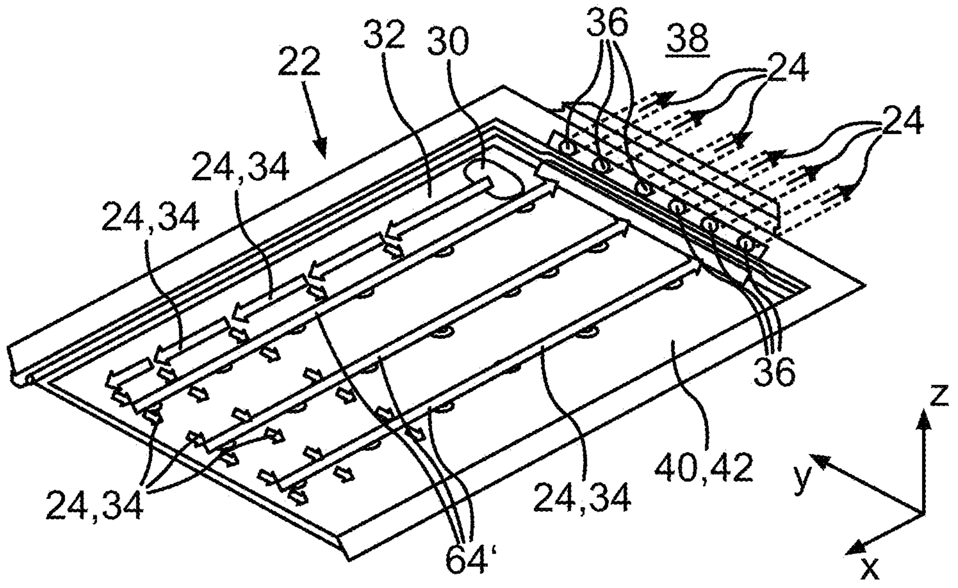
FIG. 5 shows a schematic and perspective illustration of the gas discharge channel for a battery arrangement according to an exemplary embodiment of the invention.

FIG. 1 shows a schematic cross-sectional illustration of ta a battery arrangement 10 according to an exemplary embodiment of the invention. The battery arrangement comprises multiple battery cells 12, which are provided in the form of a cell stack 14. This means that the battery cells 12 are arranged next to one another in a stacking direction, wherein the stacking direction in this case corresponds to the x-direction of the illustrated coordinate system. Cell separating elements 16*a* can be located between the cells 12. In addition, such a stack 14 can be divided into several cell groups in the stacking direction by partition walls 16*b* within a battery housing 18, of which only a housing base 20 is shown here. In addition, the battery arrangement 10 has a gas discharge channel 22 for discharging gases 24 escaping from a cell 12 in the event of thermal runaway, which are shown here in the form of arrows 24. For this purpose, a respective cell 12 has a releasable cell degassing opening 26, for example in the form of a bursting membrane or local material weakening of the cell housing, in order to enable a controlled gas discharge. The cells 12 are arranged in relation to the gas discharge channel 22 in such a way that the respective releasable cell degassing openings 26 face directly towards the gas discharge channel 22. In particular, the cells 12 can also be directly connected to and adjacent to a channel wall 28 of the gas discharge channel 22, which in the present case simultaneously represents the housing base 20 of the battery housing 18. This channel wall 28 can have corresponding inlet regions 30 which spatially correspond to the respective cell degassing openings 26. In the simplest case, the inlet regions 30 can be provided as openings or holes in the channel wall 28, which have dimensions that correspond to or are slightly larger than the dimensions of the cell degassing openings 26 arranged there or adjacent there. These openings 30 can also be covered by a protective film (not shown), which is destroyed when gas escapes and thus allows the gas to enter the channel interior 32. The inlet regions 30 can therefore also be designed as releasable openings and, for example, be covered again with a bursting element, for example a protective film or the like. If gas escapes from a battery cell 12, the gas 24 escaping from the respective cell degassing opening 26 can be introduced through the respective inlet regions 30 of the gas discharge channel 22 directly into the interior 32 of the gas discharge channel 22. In the interior 32 of the gas discharge channel 22, the gas 24 can be correspondingly guided along a gas discharge path 34 to at least one discharge region in the form of an outlet 36 (cf. FIG. 5), in particular into an environment 38 of the battery arrangement 10 and in particular of the motor vehicle in which the battery arrangement 10 is used. With regard to the preferred installation position in a motor vehicle, the represented z-direction corresponds to a vertical direction of the vehicle. For example, the x-direction shown can be a longitudinal direction of the vehicle and the y-direction shown can be a transverse direction of the vehicle. Other arrangements are also conceivable. Accordingly, it is further advantageous if a second channel wall 40 of the gas discharge channel 22 is simultaneously provided by an underride guard 42 of such a motor vehicle.

The invention and its embodiments now make it possible in a particularly advantageous manner to detect such a gas discharge from a cell 12 very simply, in a space-efficient, cost-effective and reliable manner. This will now be explained in more detail below.

For this purpose, the battery arrangement 10 comprises a sensor device 44 with a sensor element 46 and a measuring device 48, which is shown here only in dashed lines to illustrate that the measuring device 48 can basically be arranged at any other position and in particular also remotely and/or outside the high-voltage battery 50 comprising the battery cells 12 and its housing 18.

The sensor element 46 comprises an electrical line 49 which is arranged on a plastic carrier 50 of the sensor element 46 or embedded in it. The line 49 is designed in the form of a conductor loop, and the two line ends 52 are coupled to the measuring device 48.

The measuring device 48 can apply a voltage U to the electrical line 49, which is also referred to as conductor 49 below. In addition, the measuring device 48 can permanently monitor the current flow I through the conductor 49 or measure it at repeated time intervals. If no current flow I is present despite the applied voltage U, this will also indicate an interruption of the electrical conductor 49 and, accordingly, damage to the sensor element 46. The damage to the sensor element 46 can be used advantageously to detect gas discharge from a cell 12. For this purpose, the sensor element 46 is designed with a predetermined breaking point 54.

Figure 2:
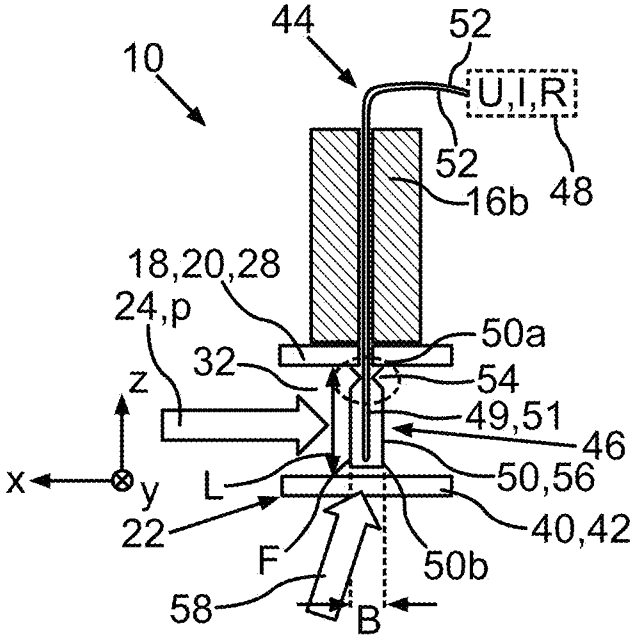
FIG. 2 shows a schematic cross-sectional illustration of a part of the battery arrangement from FIG. 1 prior to damage to the sensor element for detecting the gas discharge, according to an exemplary embodiment of the invention.

FIG. 2 again shows a schematic detailed view of a section of the battery arrangement 10 from FIG. 1, in which the sensor device 45 with the sensor element 46 is shown enlarged. The carrier 50 can, for example, be designed in the form of a plate 56 which projects into the flow core 34, in particular together with the electrical conductor 49. The plate 56 has, for example, a first end 50*a* located within the gas discharge channel 22 and an opposite second end 50*b*, wherein only one of the two ends 50*a*, 50*b* is arranged on one of the channel walls 28, 42. In the present example, the first end 50*a* is arranged on the housing base 20 as the channel wall 28, while the opposite end 50*b* is not fixed and projects loosely into the interior 32 of the gas discharge channel 22. The second end 50*b* thus represents a loose end 50*b* of the carrier 50. The predetermined breaking point 54 is arranged as close as possible to the end of the carrier 50 which is fastened to one of the channel walls, in this case the channel wall 28. The predetermined breaking point 54 can be provided as a material weakening, slit, notch, perforation or any combination thereof or the like in the carrier 50. The conductor 49 can also optionally be designed with such a material weakening, notch or the like to provide a predetermined breaking point, which, however, is not necessarily required. In particular, this can be dispensed with if the conductor 49 itself is very thin, for example as a stranded wire.

Figure 3:
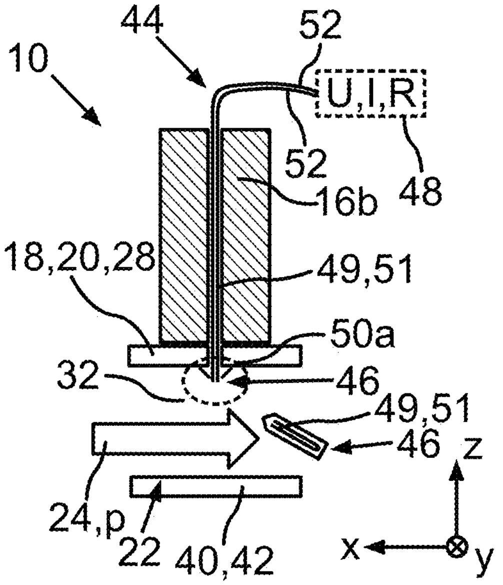
FIG. 3 shows a schematic representation of the part of the battery arrangement from FIG. 2 after damage to the sensor element has occurred, according to an exemplary embodiment of the invention.

The carrier 50 can also have a length L and a width B, wherein the length L in the present example extends in or against the z-direction and the width is defined perpendicular to the z-direction, for example in the y-direction, although the width B is shown here as a dimension in the x-direction for better illustration. The plate 56 is then preferably designed to be as thin as possible in a direction perpendicular to its length L and its width B, and can provide a corresponding flow resistance by means of a correspondingly large width B, which is in particular significantly larger than that of the conductor 49. Accordingly, the plate 56 is preferably arranged in the flow path 32 such that a gas 24 flowing along the flow path 32 impinges substantially perpendicularly on the plate surface F, which is spanned by its length L and its width B. The plate F does not necessarily have to be rectangular, but can also be semicircular or oval or have any geometry. Length and width can then refer to a maximum length and a maximum width of the carrier 50. This advantageously makes it possible to use the gas pressure p that arises when a gas 24 flows out of a cell to damage the sensor element 46 in a targeted manner by this pressure effect p, in particular to cause it to tear off, as is schematically shown in FIG. 3. The tearing occurs in the region of the predetermined breaking point 54.

The electrical line 49 is thus guided through a plate as a carrier 50 with a predetermined breaking point 54, which is guided transversely to the flow direction. Due to the gas pressure p, the plate 56 is separated at the predetermined breaking point 54 and the conductor loop 51, which is formed by the conductor 49, is correspondingly severed. This fault can be measured by the measuring device 48 via the described continuous current measurement or additionally or alternatively via a resistance measurement of a resistance R of the conductor 49.

A further positive side effect is that by measuring the electrical variable assigned to the conductor 49, such as the resistance R and/or the current I, base deformations of the underride guard 40, for example due to external influences, can also be measured. This is also illustrated schematically in FIG. 2. Such an underbody deformation caused by an external force is illustrated by the arrow 58. A deformation of the underride guard 40 as a result of such an impact 58 can also lead to the plate 56 of the sensor element 46 being compressed from below and/or severed at the predetermined breaking point 54.

These two different fault cases can be easily distinguished by the measuring device 48, for example, by using at least one further measurable parameter to verify a gas discharge, for example the temperature of the battery cells 12, which can be detected by means of one or more temperature sensors arranged distributed over the battery arrangement 10. If the temperature is within a predetermined normal range, it can be concluded that the detected damage to the sensor element 46 is due to another effect on the sensor element 46, in particular to an underbody deformation, and not to a gas discharge. Then, a signal associated with the underbody deformation can be output by the measuring device 48.

Figure 4:
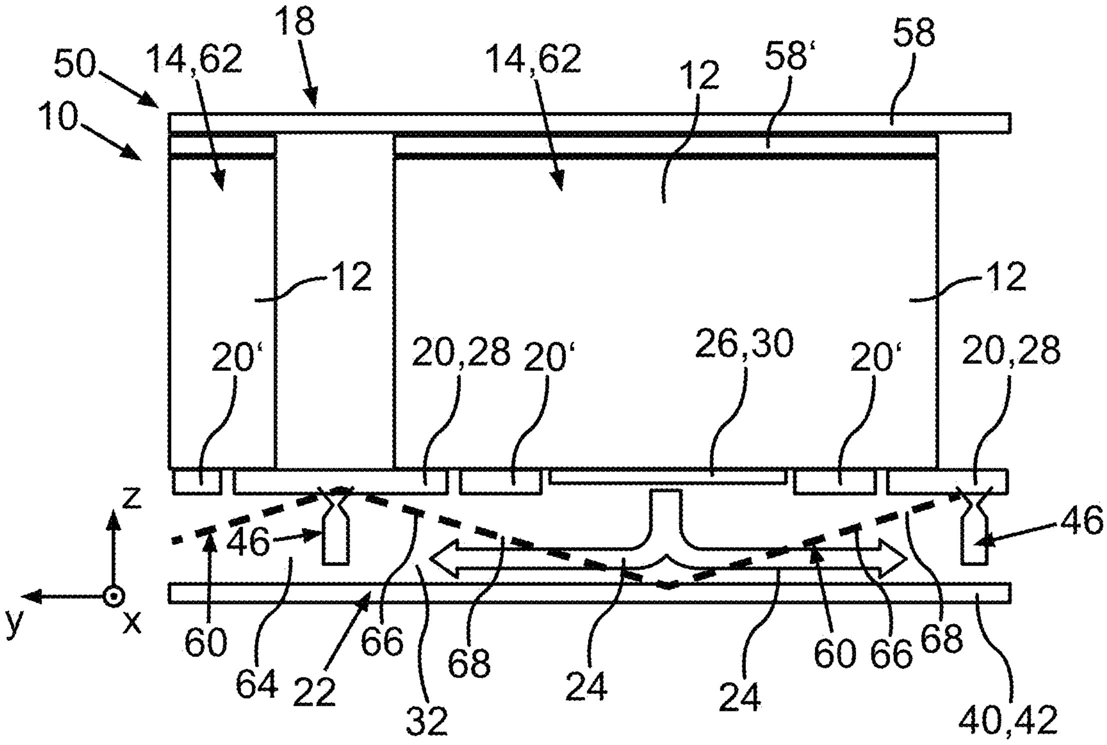
FIG. 4 shows a schematic cross-sectional illustration of a battery arrangement according to another exemplary embodiment of the invention.

FIG. 4 shows a schematic illustration of a battery arrangement 10 in a cross-section perpendicular to the x-direction according to another exemplary embodiment of the invention. The battery arrangement 10 can be designed as previously described. Only the gas discharge channel 22 is now shown in more detail.

As a further component of the housing 18, a housing cover 58 is additionally shown. This may be simultaneously designed as a cooling lid and include a cooling device 58' with integrated cooling channels that can be passed through a coolant.

The housing base 20 can also be designed as a cooling base. In the present example, this also comprises cooling channels 20' passed through by a coolant and should be interpreted as part of the cooling base 20. The gas exiting from a cell degassing opening 26 of a cell 12 can in turn enter through the inlet region 30 of the gas discharge channel 22. The inlet region 30 is in turn designed as an opening in the channel wall 28, which is provided by the housing base 20. The underride guard 40, which provides a further channel wall 42, can be connected to the cooling base 20 via gas deflection structures 60, for example screwed to the base 20 via these gas deflection structures 60, in particular in the region between two cell stacks 14, which can provide cell modules 62. These gas deflection structures 60 can form longitudinal channels 64 which run in and against the x-direction and which are correspondingly delimited by a channel wall 66 on both sides, in which openings 68 are provided through which the gas 24 can be guided through such a channel wall 66 of the gas-deflection structure 60 into the channel interior 64 or can be guided through the gas deflection structure 60. The openings 68 can be of different sizes in and against the x-direction of a corresponding gas deflection structure 60 and in particular also differ from gas deflection structure 60 to gas deflection structure 60 with regard to their position within the gas discharge channel 22. This enables targeted gas distribution and gas guidance along one or more flow paths 34 within the gas discharge channel 22, as illustrated, for example, in FIG. 5.

FIG. 5 again shows a schematic representation of the gas discharge channel 22, in particular its interior 32, as part of the battery arrangement 10, wherein the battery housing 18 with the battery cells 12 accommodated therein and also the sensor device 44 are not shown. For example, the underride guard 40 can be seen as part of the gas discharge channel 22, as well as the discharge regions 36 in order to discharge the gas 24 exiting from a cell 12, which was introduced into the gas discharge channel 22 via a corresponding inlet region 30, via a suitable gas discharge path 34, in particular into the environment 38. The gas 24 guided within the gas discharge channel 22 and the corresponding gas discharge paths 34 along which the gas 24 flows are illustrated here by the same arrows. The above described gas deflection structures 60, which are not explicitly illustrated in FIG. 5, result in three main flow paths 64', which correspond essentially to the interior 64 of the gas deflection structures 60 described in FIG. 4. The gas deflection structures 60 can, for example, be designed such that their walls 66 have no or significantly smaller openings 68 in the region of the discharge openings 36. The gas 64 entering the gas discharge channel 22 via the inlet region 30 in the region of the discharge openings 36 is thus initially forced to flow in the x-direction, since it cannot penetrate the gas deflection structure 60 in the region near the outlet. In the front region of these gas deflection structures 60, where the openings 68 are present or are available in enlarged form, a transverse flow of the gas 24 is possible, in this example, contrary to the y direction shown, whereby the gas can be spread over the various gas deflection structures 60, in particular on the interior 64 of these different gas deflection structures 60 and along the three main flow paths 64' to the outlets 36. This gas distribution can simultaneously achieve cooling of the gas 24 and particle separation.

In order to detect the gas discharge as efficiently as possible, one or more of the previously described sensor elements 46 may be located, for example, in a region within such a gas deflection structure 60 and thus within a main flow path 64', as exemplified in FIG. 4. For example, in a respective main flow path 64', exactly one such sensor element 46 can be provided. The evaluation of the sensor elements 46 can be carried out by a common measuring device 48. This makes reliable gas discharge detection possible even with very few sensor elements 46. Thus, a particularly technically simple component can be used for fault detection and, for example, a cost-effective additional fault confirmation can be generated, i.e. in addition to other detection options. Such other detection options include the use of additional sensors, for example temperature sensors and/or pressure sensors.

Overall, the examples show how the invention can be used to provide a sensor system for thermal propagation of battery cells, in particular as an alternative pressure sensor in the underride guard region.

The invention claimed is:

1. A battery arrangement comprising:

at least one battery cell having a releasable cell degassing opening;

a gas discharge channel including at least one gas inlet region, at least one gas discharge region, and at least one flow path extending from the at least one gas inlet region to the at least one gas discharge region; and a sensor device configured to detect a gas discharge from the at least one battery cell, wherein the at least one gas inlet region is configured to receive, into the gas discharge channel, gas emerging from the releasable cell degassing opening, wherein the sensor device includes at least one sensor element arranged in the gas discharge channel and projecting into the at least one flow path, wherein the at least one sensor element includes an electrical line to which a test voltage is applied, wherein the at least one sensor element is configured such that the electrical line is damageable by gas emerging from the releasable cell degassing opening and flowing through the gas discharge channel along the at least one flow path, and wherein the sensor device is configured to detect, based on a measured electrical variable associated with the electrical line, damage to the electrical line to which the test voltage is applied and to detect the gas discharge based on the detected damage to the electrical line.

2. The battery arrangement according to claim 1, wherein the at least one sensor element has a predetermined breaking point, and wherein damage to or breakage of the at least one sensor element at the predetermined breaking point damages the electrical line.

3. The battery arrangement according to claim 2, wherein the at least one sensor element includes a carrier, wherein the electrical line is arranged on or embedded in the carrier, wherein the carrier and the electrical line protrude into the at least one flow path, and wherein the predetermined breaking point is formed at least partially by the carrier.

4. The battery arrangement according to claim 1, wherein the at least one sensor element has a predetermined breaking point and is configured to be damaged at the predetermined breaking point by pressure exerted on the at least one sensor element by gas emerging from the releasable cell degassing opening and flowing along the at least one flow path.

5. The battery arrangement according to claim 4, wherein the at least one sensor element includes a carrier, wherein the electrical line is arranged on or embedded in the carrier, wherein the carrier and the electrical line protrude into the at least one flow path, and wherein the predetermined breaking point is formed at least partially by the carrier.

6. The battery arrangement according to claim 1, wherein the at least one sensor element includes a carrier, wherein the electrical line is arranged on or embedded in the carrier, wherein the carrier and the electrical line protrude into the at least one flow path, and wherein a predetermined breaking point is formed at least partially by the carrier.

7. The battery arrangement according to claim 6, wherein the carrier has a first end and a second end opposite to the first end with respect to a first direction, wherein the carrier is attached to a wall of the gas discharge channel only at the first end, and wherein the predetermined breaking point is arranged closer to the first end than to the second end.

8. The battery arrangement according to claim 6, wherein the carrier includes a plate having a length, a width, and a surface, wherein the plate protrudes into the at least one flow path in a longitudinal direction of the plate, wherein the width is greater than a conductor width of the electrical line in a direction perpendicular to the longitudinal direction, and wherein the surface is arranged at a non-zero angle relative to a flow direction of a gas flowing along the at least one flow path.

9. The battery arrangement according to claim 8, wherein the carrier has a first end and a second end opposite to the first end with respect to a first direction, wherein the carrier is attached to a wall of the gas discharge channel only at the first end, and wherein the predetermined breaking point is arranged closer to the first end than to the second end.

10. The battery arrangement according to claim 1, wherein the battery arrangement comprises multiple battery cells, each of which has a respective releasable cell degassing opening, wherein the gas discharge channel is connected to the respective releasable cell degassing openings to introduce gas emerging from each of the respective releasable cell degassing openings into the gas discharge channel through the at least one gas inlet region.

11. The battery arrangement according to claim 1, wherein the battery arrangement includes a housing in which the at least one battery cell is arranged, wherein the housing includes a housing wall, wherein the battery arrangement has a plate located outside the housing and opposite the housing wall, wherein the housing wall and the plate define walls of the gas discharge channel and the at least one flow path extends through a space between the housing wall and the plate, and wherein the at least one sensor element protrudes into the space.

12. A motor vehicle comprising the battery arrangement according to claim 1.

13. A method for detecting a gas discharge from at least one battery cell of a battery arrangement, comprising:

introducing gas emerging from a cell degassing opening of the at least one battery cell into a gas discharge channel of the battery arrangement through at least one gas inlet region of the gas discharge channel;

guiding the gas through the gas discharge channel along at least one flow path from the at least one gas inlet region to at least one gas discharge region of the gas discharge channel;

discharging the gas from the gas discharge channel through the at least one gas discharge region;

applying a test voltage to an electrical line of at least one sensor element of a sensor device of the battery arrangement, the at least one sensor element being arranged in the gas discharge channel and protruding into the at least one flow path;

detecting, by the sensor device, damage to the electrical line based on a measured electrical variable associated with the electrical line; and detecting, by the sensor device, the gas discharge based on the detected damage to the electrical line, wherein the electrical line is damageable by the gas guided through the gas discharge channel along the at least one flow path.

* * * * *